(12) United States Patent
Kulaga et al.

(10) Patent No.: US 10,703,447 B2
(45) Date of Patent: Jul. 7, 2020

(54) BRIDGED FUEL TENDER FOR MARINE VESSELS

(71) Applicant: Progress Rail Locomotive Inc., LaGrange, IL (US)

(72) Inventors: Richard Christopher Kulaga, Naperville, IL (US); Gerald Robert West, Crest Hill, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 36 days.

(21) Appl. No.: 16/052,281

(22) Filed: Aug. 1, 2018

(65) Prior Publication Data

US 2020/0039613 A1 Feb. 6, 2020

(51) Int. Cl.
*B63B 27/30* (2006.01)
*B63B 27/34* (2006.01)
*B63B 1/12* (2006.01)
*B63B 27/24* (2006.01)

(52) U.S. Cl.
CPC .............. *B63B 27/30* (2013.01); *B63B 1/121* (2013.01); *B63B 27/24* (2013.01); *B63B 27/34* (2013.01)

(58) Field of Classification Search
CPC ..... B63B 1/12; B63B 1/121; B63B 2001/123; B63B 1/125; B63B 2001/126; B63B 2001/128; B63B 25/08; B63B 25/082; B63B 2025/085; B63B 2025/087; B63B 25/10; B63B 25/12; B63B 25/14; B63B 27/24; B63B 27/25; B63B 27/30; B63B 27/34

See application file for complete search history.

(56) References Cited

U.S. PATENT DOCUMENTS

| | | | | |
|---|---|---|---|---|
| 3,494,318 A | * | 2/1970 | Katsumura | B63B 35/68 114/246 |
| 3,943,872 A | * | 3/1976 | de Does | B63B 1/12 114/74 R |
| 8,967,174 B1 | * | 3/2015 | Perreault | B63B 21/56 137/1 |

* cited by examiner

*Primary Examiner* — Ajay Vasudeva
(74) *Attorney, Agent, or Firm* — Miller, Matthias & Hull LLP

(57) ABSTRACT

A fuel tender for providing fuel to an internal combustion engine of a marine vessel may include a first pontoon, a second pontoon, and a truss structure connecting the first pontoon to the second pontoon with the first pontoon being separated from the second pontoon by a pontoon separation distance that is greater than a vessel width of the marine vessel so that the first pontoon and the second pontoon can straddle a vessel stern of the marine vessel with the truss structure disposed above a stern deck of the marine vessel. A fuel reservoir may be mounted on the truss structure and have a fuel supply line extending therefrom, with the fuel supply line being fluidly connectable to a fuel inlet port for the internal combustion engine when the first pontoon and the second pontoon straddle the vessel stern of the marine vessel.

13 Claims, 3 Drawing Sheets

BRIDGED FUEL TENDER FOR MARINE VESSELS

TECHNICAL FIELD

The present disclosure relates generally to marine vessels with internal combustion engines and, more particularly, to a bridged fuel tender for a marine vessel with an internal combustion engine fueled by an alternative fuel such as natural gas.

BACKGROUND

Natural gas is a clean burning fuel relative to gasoline and diesel with improved emission levels of hydrocarbons, nitrogen oxides (NOx), carbon oxides and particulate matter. Increasing concern over exhaust emissions regulation and fuel efficiency has led to an interest in burning combustible gaseous fuels, such as propane, hydrogen, methanol and natural gas, in internal combustion engines. The interest can be more pronounced in relation to the cost of operation of marine vessels on these alternative fuels. Natural gas in particular offers vessel owners the potential for significant reductions in operating expenses versus traditional diesel fuel.

Systems and procedures have been developed for converting existing diesel engines into engines that can combust and be powered by alternative fuels such as natural gas. Such conversions can include modifying the diesel engines with ignition systems including spark plugs and/or diesel pilot fuel, adding tanks for storing the alternative fuel efficiently, such as storing natural gas cryogenically as liquified natural gas (LNG), and adding other components such as gas handling units (GHUs) for converting the alternative fuel from the storage state to a combustible state that can be burned in the engine, and bunker modules for transferring the alternative fuel from a source to the storage tanks. Properly implemented, converting the diesel engines to burn alternative fuels can reduce fuel costs, reduce harmful emissions in the engine exhaust, extend engine life, and reduce noise output by the engine.

Currently, wide scale adoption of engine conversions to alternative fuels as the primary marine transportation fuel for workboats has been stifled by high capital costs of the vessel modifications required to carry large capacities of the alternative fuels to meet mission and journey requirements. For example, a voyage requiring 51,000 gallons of diesel fuel may require over 85,000 gallons of LNG. Additional impediments to adoption include regulatory, i.e., safety, challenges and bunkering (fueling) logistics associated with vessel line haul and midstreaming (refueling while under way) operations, and the uniqueness of each fleet owner's commercial transportation charters, vessel design, region of operation and other operational factors. The varying requirements for the marine vessels force unique, non-scalable alternative fuel storage and management solutions, resulting in high capital cost of conversion for virtually all conversion projects. The lack of standardization prevents fleet owners from realizing economies of scale, and often times results in decisions to forego conversion to alternative fuels due to prohibitively low returns on investment.

SUMMARY OF THE DISCLOSURE

In one aspect of the present disclosure, a fuel tender for providing fuel to an internal combustion engine of a marine vessel is disclosed. The fuel tender may include a first pontoon, a second pontoon, a truss structure connecting the first pontoon to the second pontoon with the first pontoon being separated from the second pontoon by a pontoon separation distance that is greater than a vessel width of the marine vessel so that the first pontoon and the second pontoon can straddle a vessel stern of the marine vessel with the truss structure disposed above a stern deck of the marine vessel, and a fuel reservoir mounted on the truss structure and having a fuel supply line extending therefrom, with the fuel supply line being fluidly connectable to a fuel inlet port for the internal combustion engine when the first pontoon and the second pontoon straddle the vessel stern of the marine vessel.

In another aspect of the present disclosure, a method for providing fuel to an internal combustion engine of a marine vessel is disclosed. The method may include bunkering fuel into a fuel reservoir of a fuel tender having a first pontoon, a second pontoon, and a truss structure connecting the first pontoon to the second pontoon with the first pontoon being separated from the second pontoon by a pontoon separation distance that is greater than a vessel width of the marine vessel, wherein the fuel reservoir is mounted on the truss structure. The method may further include connecting the fuel tender to the marine vessel so that the first pontoon and the second pontoon can straddle a vessel stern of the marine vessel with the truss structure disposed above a stern deck of the marine vessel, and fluidly connecting the fuel reservoir to the internal combustion engine of the marine vessel.

In a further aspect of the present disclosure, a liquified natural gas (LNG) fuel tender for providing fuel to an internal combustion engine of a marine vessel is disclosed. The LNG fuel tender may include a first pontoon, a second pontoon, a truss structure connecting the first pontoon to the second pontoon with the first pontoon being separated from the second pontoon by a pontoon separation distance that is greater than a vessel width of the marine vessel so that the first pontoon and the second pontoon can straddle a vessel stern of the marine vessel with the truss structure disposed above a stern deck of the marine vessel, and a LNG tank mounted on the truss structure and having a fuel supply line extending therefrom, with the fuel supply line being fluidly connectable to a fuel inlet port for the internal combustion engine when the first pontoon and the second pontoon straddle the vessel stern of the marine vessel.

Additional aspects are defined by the claims of this patent.

DETAILED DESCRIPTION

Figure 1:
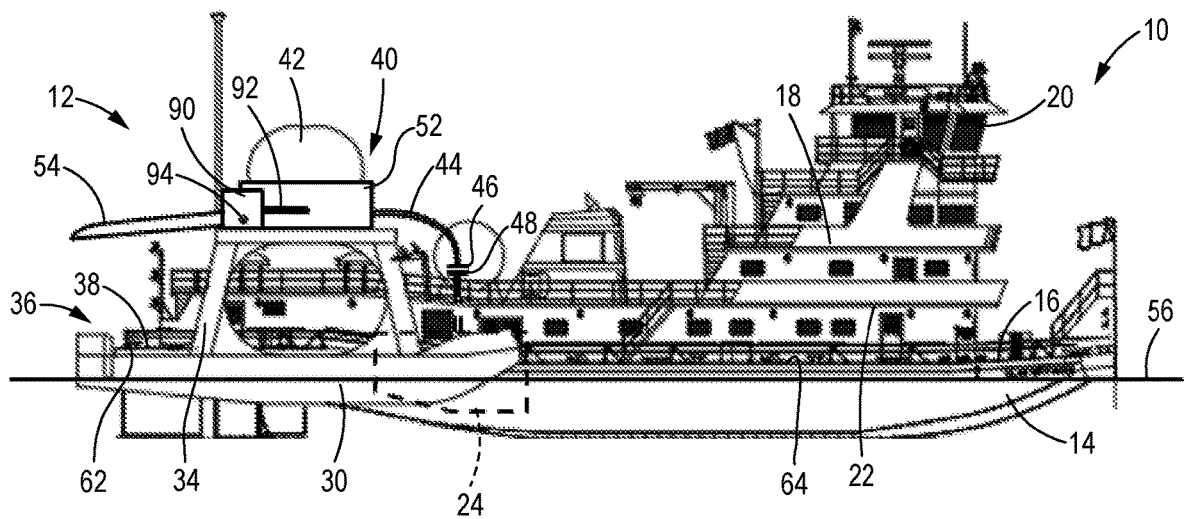
FIG. 1 is a side view of a marine vessel and a fuel tender in accordance with the present disclosure.
Figure 2:
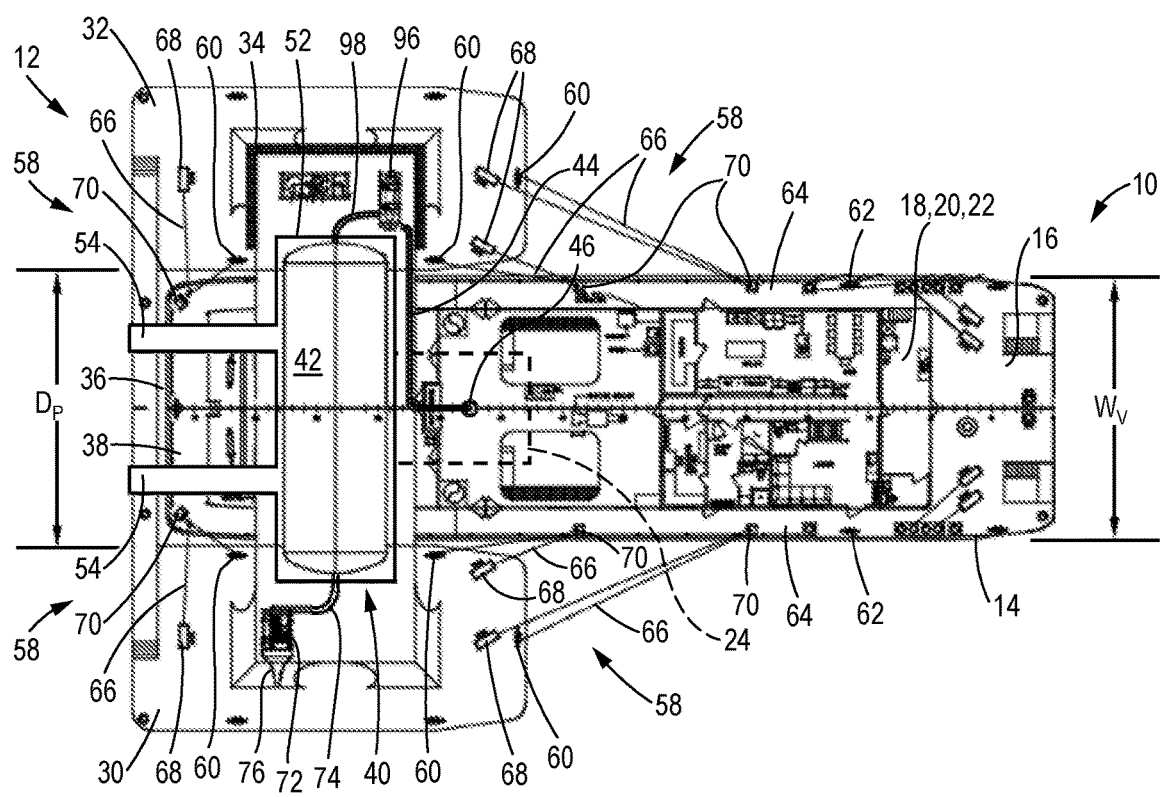
FIG. 2 is a top view of the marine vessel and the fuel tender of FIG. 1.

FIGS. 1 and 2 illustrate an example of a marine vessel 10 and an embodiment of a fuel tender 12 in accordance with the present disclosure that provides fuel to the marine vessel 10 while under way. The marine vessel 10 may be any known type of sea or inland waterway-going vessel, and may include a vessel hull 14 with a main deck 16 and a superstructure 18 rising above the main deck 16. The superstructure 18 may include the bridge 20, cabins and stowage areas 22, galleys (not shown), berths (not shown) and the like. The marine vessel 10 is powered by an onboard internal combustion engine 24. The internal combustion engine 24 may be housed in an appropriate location within the superstructure 18 as shown in the illustrative example, or below the main deck 16 within the vessel hull 14 depending on the configuration of the particular marine vessel 10.

In one particular embodiment, the internal combustion engine 24 is a diesel engine that has been converted to burn an alternative fuels such as natural gas instead of diesel fuel. The conversion of the diesel engine may have been performed using any known conversion technique for configuring a diesel engine to combust the alternative fuel in its piston cylinders. In this embodiment, the fuel tender 12 may be configured to store LNG that can be converted to gaseous natural gas and supplied to the internal combustion engine 24 for combustion. While the fuel tender 12 as illustrated and described herein may be an LNG fuel tender 12, those skilled in the art will understand that the fuel tender 12 can be configure to store gasoline, diesel fuel or other alternative fuels such as methanol, ethanol and the like, and to provide the stored fuel to the internal combustion engine 24 in similar manners as described herein.

Figure 3:
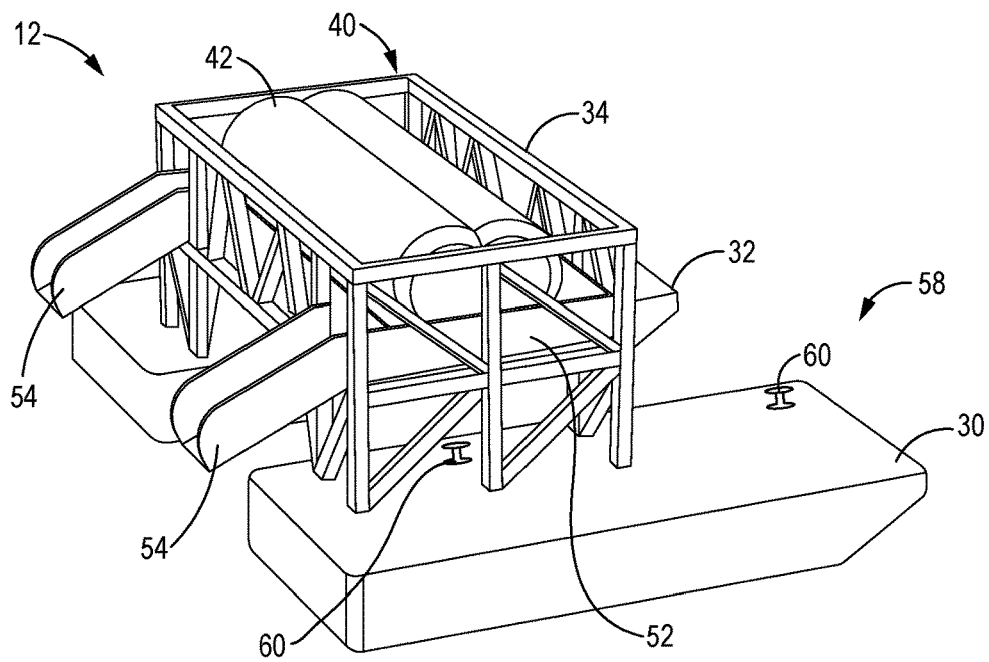
FIG. 3 is an isometric view of an alternative embodiment of a fuel tender in accordance with the present disclosure from an aft and starboard perspective.
Figure 4:
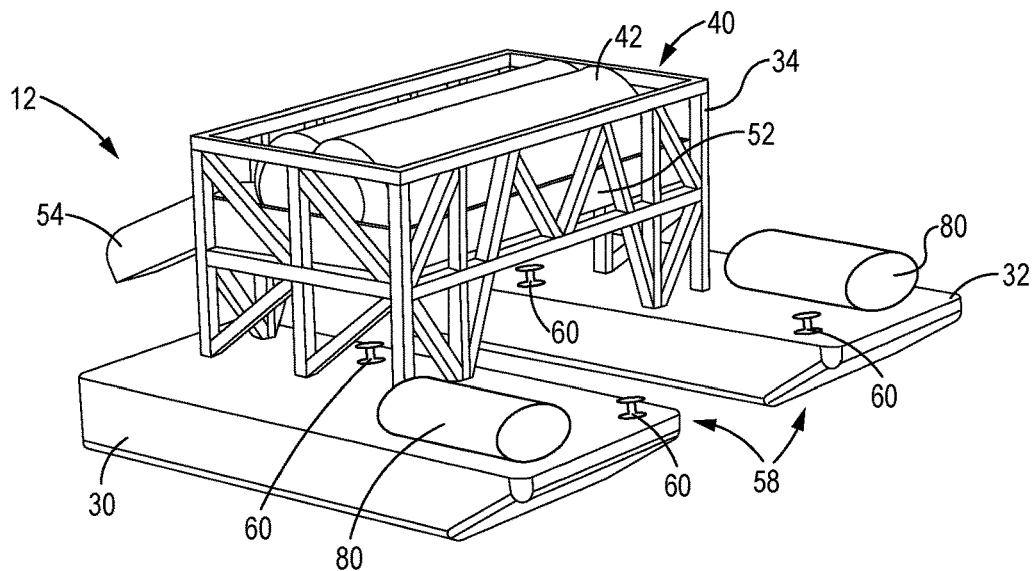
FIG. 4 is an isometric view of the fuel tender of FIG. 3 from a forward and starboard perspective and having ballast tanks mounted on pontoons of the fuel tender.

The fuel tender 12 may be configured to be positioned in a convenient location relative to the marine vessel 10 for the fuel stored on the fuel tender 12 to be delivered to the internal combustion engine 24. The fuel tender 12 as illustrated includes a first pontoon 30, a second pontoon 32 and a truss structure 34 connecting the first pontoon 30 to the second pontoon 32. The truss structure 34 and its connection to the pontoons 30, 32 are configured so that the first pontoon 30 is separated from the second pontoon 32 by a pontoon separation distance Dp (FIG. 2) that is greater than a vessel width Wv or beam of the marine vessel 10 so that the first pontoon 30 and the second pontoon 32 can straddle a vessel stern 36 of the marine vessel 10 with the truss structure 34 disposed above a stern deck 38 of the marine vessel 10. FIGS. 3 and 4 illustrate an alternative embodiment of the fuel tender 12 with an alternative configuration of the pontoons 30, 32 and the truss structure 34. Much of the description herein applies to both embodiments, and similar elements in the embodiments are identified using the same reference numerals.

The truss structure 34 as illustrated in FIGS. 1 and 2 includes a fuel reservoir retention area 40 in which a fuel reservoir 42 is mounted on the truss structure 34. In the illustrated embodiment, the fuel reservoir 42 is a pair of insulated LNG tanks that can store cryogenic LNG at a temperature and pressure necessary for the natural gas to maintain the liquid state. The fuel reservoir 42 has a fuel supply line 44 extending therefrom. The fuel supply line 44 may be a flexible fluid supply line that can allow a fuel supply line coupler 46 to be positioned at the location of a fuel inlet port coupler 48 of a fuel inlet port 50 for the internal combustion engine 24 when the pontoons 30, 32 straddle the vessel stern 36 of the marine vessel 10. Connecting the fuel supply line coupler 46 to the fuel inlet port coupler 48 places the fuel reservoir 42 in fluid communication with the internal combustion engine 24 to provide the fuel stored in the fuel reservoir 42.

With LNG in the present example being a cryogenic fluid, spillage of LNG onto the marine vessel 10 can create risk of brittle fracture in the stern deck 38. To prevent spillage off the fuel tender 12 and damage to the marine vessel 10, the fuel reservoir retention area 40 may include a fuel reservoir containment basin 52 mounted on the truss structure 34 in the fuel reservoir retention area 40 and in which the fuel reservoir 42 is disposed. The fuel reservoir containment basin 52 may be fabricated from a material that will not be damaged when it comes into contact with LNG or other potentially damaging fuels that may be stored in the fuel reservoir 42. Fuel leaking from the fuel reservoir 42 will drop into the fuel reservoir containment basin 52 and will not drop onto the stern deck 38. The fuel reservoir containment basin 52 may include a drainage chute or chutes 54 (FIGS. 1 and 3) extending rearward from the fuel reservoir containment basin 52 and downward as each drainage chute 54 extends rearward. The drainage chutes 54 allow fuel that has leaked into the fuel reservoir containment basin 52 to drain out of the fuel reservoir containment basin 52 and be discharged aft of the pontoons 30, 32 and the vessel stern 36, and into the water 56. Large LNG spills that do not evaporate quickly can be carried away from the vessel hull 14 by the currents and the propeller wash.

When the fuel tender 12 is in place with the pontoons 30, 32 straddling the marine vessel 10, the fuel tender 12 must be connected to the vessel hull 14 to ensure that the fuel tender 12 is towed along as the internal combustion engine 24 provides power to propel the marine vessel 10 through the water 56. The fuel tender 12 includes a fuel tender attachment mechanism 58 (FIG. 2) connecting at least one of the pontoons 30, 32 to the vessel hull 14 of the marine vessel 10 so that fuel tender 12 is towed by the marine vessel 10 through the water 56. Because the fuel supply line 44 is flexible and may be long enough for the fuel supply line 44 to be slack when the fuel tender 12 is in position and the fuel supply line coupler 46 is connected to the fuel inlet port coupler 48, relative movement between the vessel hull 14 and the pontoons 30, 32 can occur as the marine vessel 10 and the fuel tender 12 move through the water 56 and experience waves. Relative movement can also occur as fuel is pumped from the fuel reservoir 42 and the weight of the fuel tender 12 decreases resulting increased buoyancy and the pontoons 30, 32 rising in the water 56 during the course of a voyage. In these situations, the fuel tender attachment mechanism 58 in one embodiment may include pontoon cleats 60 mounted on the pontoons 30, 32 and vessel cleats 62 mounted on the gunwale 64 of the vessel hull 14, and ropes or hawsers 66 tied between corresponding cleats 60, 62. The hawsers 66 can be tied tight enough to prevent substantial relative movement between the vessel hull 14 and the pontoons 30, 32 to prevent damage while still allowing some relative movement to accommodate the situations discussed above. Kevlar bumpers or fenders may be installed or hung between the marine vessel 10 and the fuel tender 12 to maintain separation between the vessel hull 14 and the pontoons 30, 32 and prevent floating bodies from damaging each other.

FIG. 2 illustrates an alternative attachment mechanism 58 wherein the amount of relative movement between the vessel hull 14 and the pontoons 30, 32 may be controllable at the time of attachment and while the marine vessel 10 is under way. As shown, a free end of one of the ropes 66 is attached to the pontoon cleats 60, and the opposite end may be attached and wound onto a reel or drum (not shown) of a winch 68 that is mounted on one of the pontoons 30, 32. To connect the pontoon 30, 32 to the vessel hull 14, the rope 66 is threaded through a pulley 70 mounted on the gunwale. With the rope 66 passing over the pulley 70 and secured to the pontoon cleat 60, the winch 68 can be actuated to take up the slack in the rope 66 and draw the fuel tender 12 to the vessel hull 14. The tension in the rope 66 can be controlled by the winch 68 to control the relative movement between the vessel hull 14 and the pontoons 30, 32. Further alternative fuel tender attachment mechanisms 58 allowing relative movement between the vessel hull 14 and the pontoons 30, 32 will be apparent to those skilled in the art and are contemplated by the inventors.

In other situations, it may be desirable to implement a fuel tender attachment mechanism 58 that attaches the pontoons 30, 32 to the vessel hull 14 and substantially prevents relative movement between the vessel hull 14 and the pontoons 30, 32. For example, in some implementation, the fuel tender 12 may include a ballast tank or ballast tanks 80 (FIG. 4) mounted on the truss structure 34 or the pontoons 30, 32 that can be filled or drained to control the weight and buoyancy of the fuel tender 12. The ballast tanks 80 may be used when it is desired to maintain the buoyancy and the position of fuel tender 12 in the water 56 relatively constant over the course of the voyage and thereby maintain a constant draft for the pontoons 30, 32. As fuel is pumped out of the fuel reservoir 42 to the internal combustion engine 24, pumps (not shown) for the ballast tanks 80 may add water to the ballast tanks 80 in sufficient quantity to balance the weight of fuel pumped from the fuel reservoir 42 and maintain a relatively constant buoyancy of the fuel tender 12. The water pumped into the ballast tanks 80 could come from the water 56 over which the marine vessel 10 and the fuel tender 12 are traveling, or from sources onboard the marine vessel 10 such as a gray water storage tank (not shown) storing water from showers, sinks and other sources of water that has been used onboard during the voyage. In alternative embodiments, recognizing that the pontoons 30, 32 are essentially small hollow barges, the pontoons 30, 32 may be filled with and emptied of ballast water to maintain a desired draft of the fuel tender 12 in a similar manner as the ballast tanks 80 in the illustrated embodiment. With the relative positions of the marine vessel 10 and the fuel tender 12 remaining relatively constant due to ballast management, the fuel tender attachment mechanism 58 implemented with the fuel tender 12 may provide a relatively rigid connection between pontoons 30, 32 and the vessel hull 14. The fuel tender attachment mechanism 58 can include cables, clamps, struts, reinforcement bars and other types of rigid coupling structures that can connect the pontoons 30, 32 to the vessel hull 14 and prevent relative movement between the marine vessel 10 and the fuel tender 12 as they move through the water 56.

When a diesel engine is converted to burn alternative fuels such as natural gas, additional equipment may be required to ensure that the alternative fuel is stored efficiently prior to being delivered to the converted engine, and to convert the alternative fuel from the storage state to a state that is combustible in the converted engine. In the case of natural gas, for example, natural gas is converted to cryogenic LNG and stored in insulated LNG tanks to prevent the LNG from changing from the liquid state to the combustible gaseous state. A bunker module as is known in the art is needed to transfer the natural gas from a source of the natural gas to the insulated LNG tank and perform any conversion of the natural gas necessary to ensure that it is stored as LNG in the tank. At the other end of the process, the LNG stored in the LNG tank must be converted back to gaseous natural gas that can be combusted by the converted engine. The conversion from LNG to combustible natural gas can be performed by a component such as a gas handling unit (GHU) that is known in the art. Along with the insulated LNG tanks, and bunker module and the GHU can be expensive components that oftentimes occupy more space on a vessel than is available or than a vessel owner will readily use at the expense of reducing the amount of revenue generating cargo that can be carried onboard the vessel. Moreover, onboard installation of storage tanks, bunker modules, GHUs and other necessary equipment can increase the down time that the marine vessel 10 is out of service and not earning revenue for the owner.

The fuel tender 12 in accordance with the present disclosure can facilitate moving the additional equipment off the marine vessel 10 to conserve space potentially reducing the capital expenditure required to enable the marine vessel 10 to accommodate alternative fuel, and reducing the down time for the marine vessel 10. The truss structure 34 can be configured to provide space for the components in addition to the space for the fuel reservoir 42, and to connect the components to the fuel reservoir 42 so that only the connection between the couplers 46, 48 is required once the fuel tender 12 is in place above the stern deck 38. Referring to FIGS. 1 and 2, the truss structure 34 may carry a bunker module 90 proximate the fuel reservoir 42. The bunker module 90 may be connected to the fuel reservoir 42 by a bunker fluid supply line 92, and may have a bunker fill port 94 to which a fuel supply line (not shown) from a fuel source may be connected to file the fuel reservoir 42. The bunker module 90 and/or the bunker fill port 94 may be disposed at any appropriate location on the truss structure 34 or one of the pontoons 30, 32 that will be convenient for attachment of the fuel supply line when the fuel tender 12 is taken to a bunkering station or barge. The truss structure 34 may also carry a GHU 96 in a location that is convenient for connecting the GHU 96 to the fuel reservoir 42 via a GHU fuel inlet line 98 (FIG. 2). The GHU 96 may also be located in a convenient position for the fuel supply line 44 to extend there from and be connected to the fuel inlet port 50 by the couplers 46, 48. In this arrangement, LNG flows into the GHU 96 through the GHU fuel inlet line 98, the LNG is converted to combustible natural gas, and the combustible natural gas is transmitted to the internal combustion engine 24 through the fuel supply line 44. Offloading the fuel reservoir 42, the bunker module 90 and the GHU 96 to the fuel tender 12 reduces that space requirement onboard the marine vessel 10 for the engine conversion, and the capital investment may be reduced by sourcing the fuel tender 12 from a third party instead of purchasing the equipment outright.

INDUSTRIAL APPLICABILITY

Figure 5:
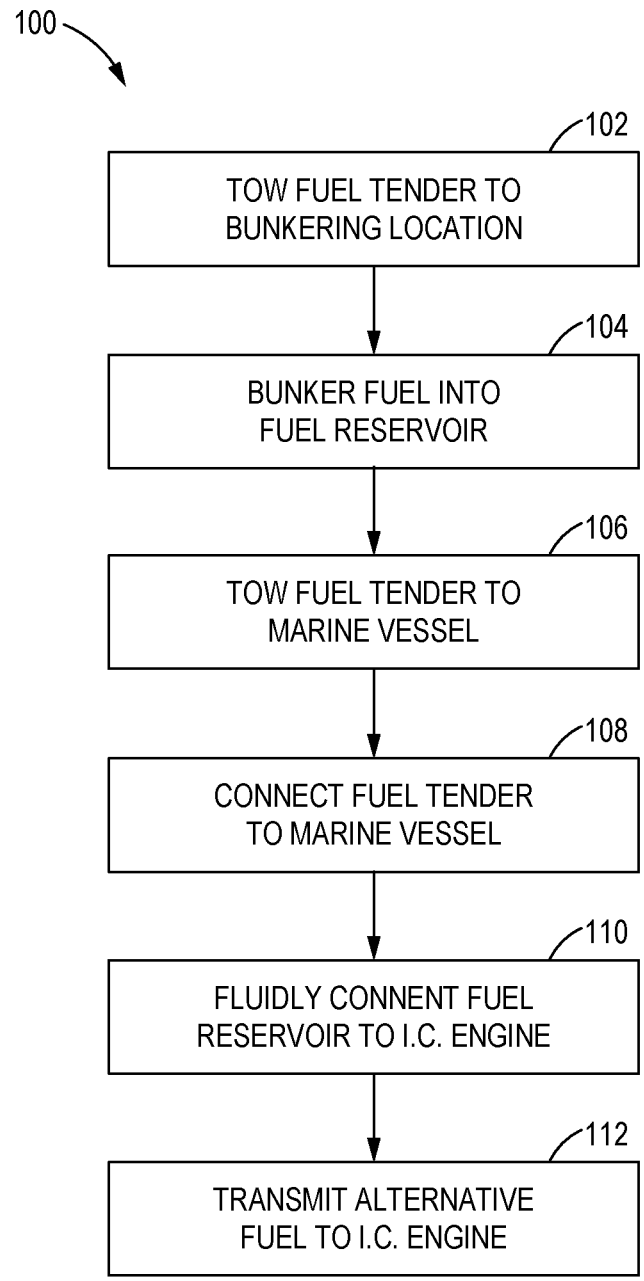
FIG. 5 is a flow diagram of a fuel supply routine in accordance with the present disclosure.

The fuel tender 12 in accordance with the present disclosure may incentivize conversion of the existing internal combustion engine 24 on the marine vessel 10 to consume alternative fuel, reduce the cost of the conversion and subsequent operation of the marine vessel 10, and provide a fleet owner with flexibility in deploying their marine vessels 10 most efficiently for shipping, towing, tugging or other tasks to be completed by the fleet. FIG. 5 illustrates one embodiment of a fuel supply routine 100 for using the fuel tender 12 to supply the alternative fuel to the internal combustion engine 24 that has been converted to burn the alternative fuel. Prior to the marine vessel 10 beginning a voyage, the fuel supply routine 100 begins at a block 102 where the fuel tender 12 detached from the marine vessel 10 is towed to a bunkering location (not shown) where the fuel reservoir 42 can be filled with the alternative fuel. The bunkering location may be onshore or at a bunkering or refueling facility. Alternatively, the bunkering location may be an offshore facility such as a bunkering barge where it may not be convenient to bring the marine vessels 10 and the fuel tenders 12 close to shore.

With the fuel tender 12 towed to the bunkering location at the block 102, control may pass to a block 104 where the natural gas is bunkered into the fuel reservoir 42 of the fuel tender 12. In the illustrated example, a fuel supply line of the bunkering facility is fluidly connected to the bunker fill port 94. As the natural gas or LNG is pumped into the bunker module 90, the bunker module 90 delivers LNG to the fuel reservoir 42 in the cryogenic state necessary for storage in the fuel reservoir 42. For other alternative fuels, the bunker module 90 may perform any functions necessary for storage of the particular alternative fuel, or the bunker module 90 may be omitted and the alternative fuel may be pumped directly into the fuel reservoir 42 from the bunkering source if no conversion or other conditioning of the alternative fuel is required for storage in the fuel reservoir 42.

After the fuel reservoir 42 is filled at the bunkering location in the block 104, control may pass to a block 106 where the fuel tender 12 is towed from the bunkering location to the marine vessel 10, and to a block 108 where the fuel tender 12 is connected to the marine vessel 10 to be towed thereby during the voyage. As discussed above, the fuel tender 12 may be put in place at the marine vessel 10 with the pontoons 30, 32 straddling the vessel hull 14 at the vessel stern 36 of the marine vessel 10 with the truss structure 34 and the fuel reservoir 42 disposed above the stern deck 38. Once in position, the fuel tender 12 may be connected to the marine vessel 10 by the fuel tender attachment mechanism 58.

With the fuel tender 12 in place relative to the marine vessel 10 and connected by the fuel tender attachment mechanism 58, control may pass to a block 110 where the fuel reservoir 42 is fluidly connected to the internal combustion engine 24 via the fuel supply line 44. The connection may be direct, or may be through an intermediate component such as the GHU 96 where the alternative fuel requires conversion from its stored state to its combustible state for use by the internal combustion engine 24. Once the fluid connection is established, the marine vessel 10 may set out for service with the fuel reservoir 42 transmitting the alternative fuel to the internal combustion engine 24 at a block 112.

The pontoon-based fuel tenders 12 in accordance with the present disclosure remove many of the capital cost burdens and onboard space issues from the owner of the marine vessel 10. The onboard portion of the diesel-to-alternative fuel engine conversion can be limited to the actual modifications to the internal combustion engine 24, while the fuel reservoir 42 and, if necessary, other components required to supply the alternative fuel to the converted internal combustion engine 24 can be offloaded to the fuel tender 12. The fuel tender 12 can be anchored at the vessel stern 36 of the marine vessel 10 and the flexible fuel supply line 44 can be attached to the fuel inlet port 50 to the internal combustion engine 24. This can allow for a single configuration of the fuel tender 12 to be used with different marine vessels 10 having converted internal combustion engines 24. This can also allow for fuel tenders 12 have varying fuel capacities to be used with the same marine vessel 10 so that only the storage capacity and corresponding weight necessary for a particular voyage need to be used, and excess weight of the fuel tender 12 and corresponding increased fuel consumption during the voyage can be avoided.

The fuel tenders 12 in accordance with the present disclosure may significantly lower the capital cost to the vessel owner versus prior conversions where all the components are installed onboard the converted vessel. Moreover, the fuel tenders 12 may provide full scalability to meet vessel mission and fuel consumption requirements without the necessity of midstreaming, or refueling while under way. Elimination of midstreaming can reduce the operating costs incurred in navigating to and performing in route refueling, and reduce regulatory and safety exposure incurred during midstreaming operations. As a separate piece of floating equipment, the fuel tenders 12 may solve numerous bunkering and logistics challenges presented by onboard diesel-to-alternative fuel conversions regardless of the size of the marine vessel 10, the vintage of the marine vessel 10 and its internal combustion engine 24, charter contracts and the like.

In alternative implementations, the fuel tenders 12 can be configured to carry additional fluids used onboard the marine vessel 10 during a voyage, such as diesel fuel, potable water, diesel exhaust fluid (DEF), and numerous other supplies. Offloading such non-revenue generating cargo to the fuel tender 12 can reduce the operating costs of the marine vessel 10 and increase the capacity for carrying revenue generating cargo. Additionally, the fuel tenders 12 may be readily adaptable to carry other alternative fuels such as methanol and ethanol to which the legacy engines may be converted in lieu of LNG.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A fuel tender for providing fuel to an internal combustion engine of a marine vessel, the fuel tender comprising:
    a first pontoon;
    a second pontoon;
    a truss structure connecting the first pontoon to the second pontoon with the first pontoon being separated from the second pontoon by a pontoon separation distance that is greater than a vessel width of the marine vessel so that the first pontoon and the second pontoon can straddle a vessel stern of the marine vessel with the truss structure disposed above a stern deck of the marine vessel;
    a fuel reservoir mounted on the truss structure and having a fuel supply line extending therefrom, with the fuel supply line being fluidly connectable to a fuel inlet port for the internal combustion engine when the first pontoon and the second pontoon straddle the vessel stern of the marine vessel; and a fuel reservoir containment basin mounted on the truss structure and in which the fuel reservoir is disposed.

2. The fuel tender of claim 1, wherein fuel leaking from the fuel reservoir is received into the fuel reservoir containment basin.

3. The fuel tender of claim 2, wherein the fuel reservoir containment basin comprises a drainage chute extending rearward from the fuel reservoir containment basin and downward as the drainage chute extends rearward such that fuel in the fuel reservoir containment basin drains off the drainage chute and aft of the first pontoon, the second pontoon and the marine vessel.

4. The fuel tender of claim 1, wherein the fuel tender provides combustible natural gas to the internal combustion engine of the marine vessel, the fuel tender comprising a gas handling unit (GHU) fluidly connecting the fuel reservoir to the fuel supply line, wherein the GHU receives liquified natural gas (LNG) from the fuel reservoir, converts the LNG to the combustible natural gas, and transmits the combustible natural gas to the internal combustion engine of the marine vessel.

5. The fuel tender of claim 1, comprising a fuel tender attachment mechanism connecting at least one of the first pontoon and the second pontoon to the marine vessel so that fuel tender is towed by the marine vessel through water.

6. The fuel tender of claim 5, wherein the fuel tender attachment mechanism connects the first pontoon and the second pontoon to the marine vessel such that the first pontoon and the second pontoon move through the water with the marine vessel without relative movement there between.

7. The fuel tender of claim 1, wherein the fuel reservoir is configured to store liquified natural gas (LNG).

8. A liquified natural gas (LNG) fuel tender for providing fuel to an internal combustion engine of a marine vessel, the LNG fuel tender comprising:
a first pontoon;
a second pontoon;
a truss structure connecting the first pontoon to the second pontoon with the first pontoon being separated from the second pontoon by a pontoon separation distance that is greater than a vessel width of the marine vessel so that the first pontoon and the second pontoon can straddle a vessel stern of the marine vessel with the truss structure disposed above a stern deck of the marine vessel;
a LNG tank mounted on the truss structure and having a fuel supply line extending therefrom, with the fuel supply line being fluidly connectable to a fuel inlet port for the internal combustion engine when the first pontoon and the second pontoon straddle the vessel stern of the marine vessel; and
a LNG containment basin mounted on the truss structure and in which the LNG tank is disposed.

9. The LNG fuel tender of claim 8, wherein fuel from the LNG tank is received into the LNG containment basin.

10. The LNG fuel tender of claim 9, wherein the LNG containment basin comprises a drainage chute extending rearward from the LNG containment basin and downward as the drainage chute extends rearward such that LNG in the LNG containment basin drains off the drainage chute and aft of the first pontoon, the second pontoon and the marine vessel.

11. The LNG fuel tender of claim 8, comprising a gas handling unit (GHU) fluidly connecting the LNG tank to the fuel supply line, wherein the GHU receives LNG from the LNG tank, converts the LNG to gaseous natural gas, and transmits the gaseous natural gas to the internal combustion engine of the marine vessel.

12. The LNG fuel tender of claim 8, comprising a fuel tender attachment mechanism connecting at least one of the first pontoon and the second pontoon to the marine vessel so that LNG fuel tender is towed by the marine vessel through water.

13. The LNG fuel tender of claim 12, wherein the fuel tender attachment mechanism connects the first pontoon and the second pontoon to the marine vessel such that the first pontoon and the second pontoon move with the marine vessel through the water without relative movement there between.

* * * * *